United States Patent
David et al.

(10) Patent No.: US 12,265,618 B1
(45) Date of Patent: Apr. 1, 2025

(54) SYSTEM AND METHOD FOR EFFICIENT MALICIOUS CODE DETECTION AND MALICIOUS OPEN-SOURCE SOFTWARE PACKAGE DETECTION USING LARGE LANGUAGE MODELS

(71) Applicant: APIIRO LTD., Tel Aviv (IL)

(72) Inventors: Gil David, Zikhron Ya'akov (IL); Eli Shalom, Tel Aviv-Jaffa (IL); Idan Plotnik, Herzliya (IL); Yonatan Eldar, Tel Aviv-Jaffa (IL)

(73) Assignee: APIIRO LTD., Tel Aviv (IL)

( * ) Notice: Subject to any disclaimer, the term of this patent is extended or adjusted under 35 U.S.C. 154(b) by 0 days.

(21) Appl. No.: 18/885,799

(22) Filed: Sep. 16, 2024

Related U.S. Application Data

(60) Provisional application No. 63/538,319, filed on Sep. 14, 2023.

(51) Int. Cl.
 *G06F 21/00* (2013.01)
 *G06F 16/334* (2025.01)
 *G06F 21/56* (2013.01)

(52) U.S. Cl.
 CPC ........ *G06F 21/563* (2013.01); *G06F 16/3347* (2019.01)

(58) Field of Classification Search
 CPC .... G06F 21/552; G06F 21/577; G06F 21/566; G06F 21/563; G06F 21/554; G06F 2201/865; G06F 40/20; G06F 16/35; G06F 16/55; G06F 16/3347
 See application file for complete search history.

(56) References Cited

U.S. PATENT DOCUMENTS 12,001,462 B1 * 6/2024 Madisetti ............ G06F 16/3329

OTHER PUBLICATIONS

A Survey of Machine Learning for Big Code and Naturalness (Year: 2018).*

* cited by examiner

*Primary Examiner* — Tri M Tran
(74) *Attorney, Agent, or Firm* — Rivka Friedman

(57) ABSTRACT

A method for the efficient use of Large Language Models (LLMs) in malicious code detection, the method including: assessing code and assigning a probability level of being malicious; and running code assessed to be above a predetermined probability level through an LLM to determine if the code is malicious.

7 Claims, 9 Drawing Sheets

SYSTEM AND METHOD FOR EFFICIENT MALICIOUS CODE DETECTION AND MALICIOUS OPEN-SOURCE SOFTWARE PACKAGE DETECTION USING LARGE LANGUAGE MODELS

This patent application claims priority from, and the benefit of, U.S. Provisional Patent Application No. 63/538,319, filed Sep. 14, 2023, which is incorporated in its entirety as if fully set forth herein.

FIELD OF THE INVENTION

The present invention relates to the field of software security and, more particularly, to a novel system and method for automatically detecting malicious code and malicious open-source software (OSS) and closed source software (CSS) packages using Large Language Models (LLMs).

BACKGROUND OF THE INVENTION

As the number of OSS packages and codebases multiply, not to mention software packages and codebases that are not open-source, detecting malicious packages and code has become increasingly challenging. Malicious packages and code, which introduce new patterns of attacks, consistently present significant risks to software systems. Traditional code scanning and analysis methods are ill-equipped to handle the magnitude and complexity of modern software projects, necessitating more efficient and scalable detection mechanisms. LLMs are able to recognize malicious code, with the 'understanding' that certain activities are indicative of malicious code, e.g., retrieving passwords and sending them over the internet; erasing code which is not part of the stated functions of the program, etc. One of the major challenges is that using LLMs to scan the vast amount of OSS on the internet is infeasible due to the immense computing power required to run these large neural networks repeatedly

SUMMARY OF THE INVENTION

According to the present invention there is provided a method for the efficient use of Large Language Models (LLMs) in malicious code detection, the method including: assessing code and assigning a probability level of being malicious; and running code assessed to be above a predetermined probability level through an LLM to determine if the code is malicious.

According to further features in preferred embodiments of the invention the method further includes filtering the code, prior to the assessing step, to determine whether the code is capable of performing one or more activities of a predetermined set of activities necessary for malicious activity.

According to still further features the filtering step employs a binary filter.

According to still further features the assessing step uses at least heuristics to determine the probability level of maliciousness.

According to still further features the assessing step employs a Code Embedding mechanism to determine the probability level of maliciousness, the code embedding mechanism including: generating a vector representation of the code being assessed, comparing and clustering of the vector representation with a database of malicious code embeddings, and assigning a probability value based on similarity to one or more of the malicious code embeddings; wherein the probability value is used in calculating the probability level during the assessing step.

According to still further features the database of malicious code embeddings includes a plurality attack embedding vectors each generated by a code embedding mechanism from a corresponding malicious code.

According to still further features the assessing step employs a prompt Embedding mechanism to determine the probability level of maliciousness, the prompt embedding mechanism including: generating a vector representation of the code being assessed, comparing and clustering of the vector representation with a database of malicious prompt embeddings, and assigning a probability value based on similarity to one or more of the malicious code embeddings; wherein the probability value is used in calculating the probability level during the assessing step.

According to still further features the database of malicious prompt embeddings includes a plurality prompt embedding vectors each generated by a descriptions processor from a corresponding free-text description of a malicious cyber-attack technique.

According to another embodiment, there is provided a method for efficient use of Large Language Models (LLMs) in malicious code detection, the method including: generating a Large Language Model (LLM) Code Pattern (LCP) detector, generating the LCP detector includes: generating a plurality of LLM embeddings from respective malicious code segments; enhancing each of the LLM embeddings with metadata to form LLM code Patterns (LCPs) of malicious code; indexing the LCPs in a vector database; embedding code to receive code embeddings; and comparing the code embeddings to the LCPs of malicious code in the vector database.

According to further features the method further includes clustering the code embeddings; and flagging abnormal patterns of clustering that are associated with malicious campaigns. According to further features an abnormal pattern of clustering includes multiple code embeddings of recently published code segments exhibit high similarity to each other.

According to still further features the method further includes generating new LCPs from embeddings of new malicious code segments; adding the new LCPs to the vector database. According to still further features the method further includes re-comparing the code embeddings to the vector database with the new LCPs.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
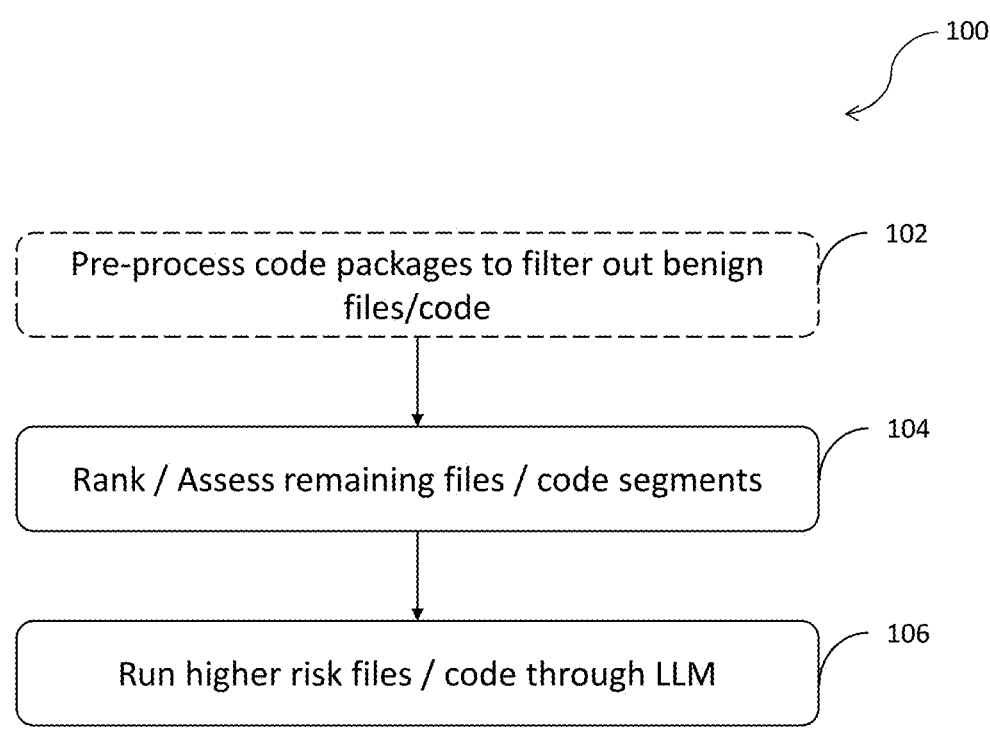
FIG. 1 is a flow diagram of an overview of the instant process and method.

The principles and operation of a system and method for efficient malicious code detection using large language models according to the present invention may be better understood with reference to the drawings and the accompanying description.

The invention introduces a systematic and methodical approach for automatically detecting malicious code in codebases and malicious OSS packages using LLMs. The system integrates various mechanisms, such as intelligent code sampling, cascading filters based on Language Models (LMs), a malicious pattern recognition enhancer, an LLM-based detector, and self-improving mechanisms. This enables efficient detection of, and alerting to, potentially harmful packages and code. The methods discussed herein are relatively cheap, and their impact on the scanning accuracy of the OSS is minimal, enabling a balance between cost and efficiency.

Efficient LLM-Based Detection Mechanism

Powerful LLMs can often detect various forms of malicious code. However, these models lack scalability and are expensive to run on large codebases. By employing cascading filters and smaller LMs, the efficient detection mechanism selects relevant files and code fragments that are likely to be malicious, and runs only these through the LLMs.

The decision as to which files and code fragments the instant efficient detection mechanism selects is grounded in the understanding of the fundamental capabilities necessary for an attack. Every form of attack necessitates certain capabilities to achieve its malicious objectives. These capabilities can range from the capacity to read data from global storage and/or write new files, to executing, or having the capacity to execute, external calls intended to dispatch sensitive information.

By pre-analyzing the code, the system can spot these attack capabilities and filter out code segments that are devoid of them, i.e., benign files/code segment. Since any type of attack hinges on these capabilities, the absence of these capabilities is a strong indicator that the code piece that is being inspected is incapable of carrying out a harmful activity. For instance, if a piece of code lacks the ability to read or write to other files, then its potential to steal data or dispatch passwords is negligible to non-existent. Therefore, by identifying and weeding out code that is not capable of these activities in the preprocessing stage, the system significantly streamlines the scanning load or burden on the LLM, thereby optimizing its efficiency and reliability.

For example, files that can publish to the web are files that are relevant to check, whereas files that cannot publish to the internet, are not likely to include malicious code because such files cannot send out passwords or other secrets, even if they find them. Similarly, if code cannot or does not read other files, then the likelihood that this code is malicious is much smaller than the likelihood of code that can or does read other files is malicious. This is because code that cannot read other files cannot steal data from them, for example, from a crypto wallet.

Therefore, files or code that have very limited capabilities are unlikely to be malicious and are consequently filtered out by a smaller LM.

Additionally, the system uses heuristics to determine which files/code are/is likely to be malicious. For example, the names of the files are analyzed. Files that are closer to the entry point of a system/root of a repository are more likely to be malicious. LLMs are able to point to files that have a high statistical probability of being malicious, based on the file names (e.g., a setup.exe, install.py and similar files are most likely to have malicious code). The LM or LLM selects a small number of files to run through the LLM which will scan for maliciousness.

After initial scanning and analysis, irrelevant files are filtered out, and the remaining files are ranked by their likelihood of being malicious. Files with a non-negligible likelihood are then sent to a large LLM for a final determination of maliciousness. This approach significantly improves the efficiency and feasibility of using LLMs for malicious code detection.

Referring now to the drawings, FIG. 1 illustrates a flow diagram of an overview of the instant process and method. Diagram 100 starts at step 102 which is a pre-processing or filtering step, as discussed above, for preprocessing code packages to filter out files or code segments that are deemed benign as they are incapable of performing one or more activities of a predetermined set of activities, such as those mentioned above. Files/code segments that are incapable of being malicious are filtered out. In embodiments, the filtering process employs a binary filter or a set of binary filters or cascading filters in the preprocessing step. One example of the binary question could be: is the code capable or incapable of accessing the Internet (e.g., capable of sending stolen passwords to a third party over the Internet)? A cascading filter in use could, for example, look like: 'Can the code read (e.g., cryptocurrency passwords)?-> 'Yes'-> 'Can the code access the Internet?'-> 'Yes'; Then flag as capable of malicious activity and move to the next step.

Step 104 is an assessing or ranking step. In step 104, non-filtered files and code segments are ranked/assessed according to a likelihood of being malicious. Various techniques and methods for making such assessments or performing such ranking are discussed in further detail hereafter. In embodiments, more than one process or mechanism is used to assess or rank the code. Each process or mechanism outputs or assigns a probability value to the assessed code. That probability value is used in combination with other probability values received from other assessment tools (that are run concurrently or sequentially) to calculate/determine the probability level of the assess code. If the code's probability level is above a predetermined probability level, then the code is run through an LLM to determine if the code is malicious. In cases where only one process/mechanism is used during the assessment step, then the resulting probability value is equal to the probability level.

In step 106, non-filtered files and code segments, ranked above the predetermined threshold, are run through the LLM to better determine whether or not they are malicious. In this manner, the LLMs are more efficiently used on a much smaller set of inputs thanks to steps 102 and 104. The assessing/ranking tools may be used individually or in any combination in order to determine which files/code segments should be sent to the LLM for more intensive review and scrutiny.

Code Embedding and Clustering

Code embedding is a technique used to convert pieces of source code into fixed-size numerical vectors (embeddings)

that capture the syntactic and semantic properties of the code and functional relationships between code snippets. Code embeddings are a transformative way to represent code snippets as dense vectors in a continuous space. Similar to word embeddings in natural language processing (NLP), code embeddings position similar code snippets close together in the vector space, allowing machines to understand and manipulate code more effectively. These embeddings are used as inputs to machine learning models for various tasks such as code search, code completion, bug detection, and automatic code generation.

The key concepts in code embedding are:
1. Tokenization:
   Lexical Analysis: Code is broken down into tokens such as keywords, identifiers, operators, and literals. This process is akin to tokenizing text in NLP.
   Abstract Syntax Tree (AST): The code is parsed into a tree structure representing its syntactic structure. Nodes in the AST correspond to syntactic constructs like expressions, statements, and declarations.
2. Embedding Methods:
   Word Embeddings: Similar to word embeddings in NLP (like Word2Vec or GloVe), tokens from code can be embedded into vectors. These vectors capture semantic similarities between tokens.
   Contextual Embeddings: Techniques like BERT or GPT can be adapted to code. Models like OpenAI's Codex or Google's CodeBERT are trained on large corpora of code to generate contextual embeddings.
   Graph-based Embeddings: Since code has a structured nature, graph neural networks (GNNs) can be used to embed code by capturing dependencies and relationships between different parts of the code.
3. Applications:
   Code Search and Retrieval: Given a natural language query, find the most relevant code snippets.
   Code Similarity: Given a code fragment, find the most relevant code snippets.

Innovatively, the present system utilizes smart embedding to represent code efficiently, with tuning that captures the essence and potential maliciousness of code. The vector representation enables efficient similarity comparison and clustering of code at varying levels of granularity.

For example, batches of similar code that are released together are suspicious as being part of an attack that includes close variations of malicious code in the hopes that some of the malicious packages will not be flagged.

Given a code base of malicious code snippets, the code embedding mechanism is applied on each code fragment. Then, given new code snippets for analysis, their code embedding is compared to the embeddings of the malicious snippets. Then, code snippets with high similarity to malicious embeddings are flagged as suspicious/malicious.

To provide a final decision regarding their maliciousness, the flagged code snippets are sent to the LLM-based detector. This way, the number of code snippets that are analyzed by the more expensive LLM-based detector is dramatically reduced.

Figure 2A:
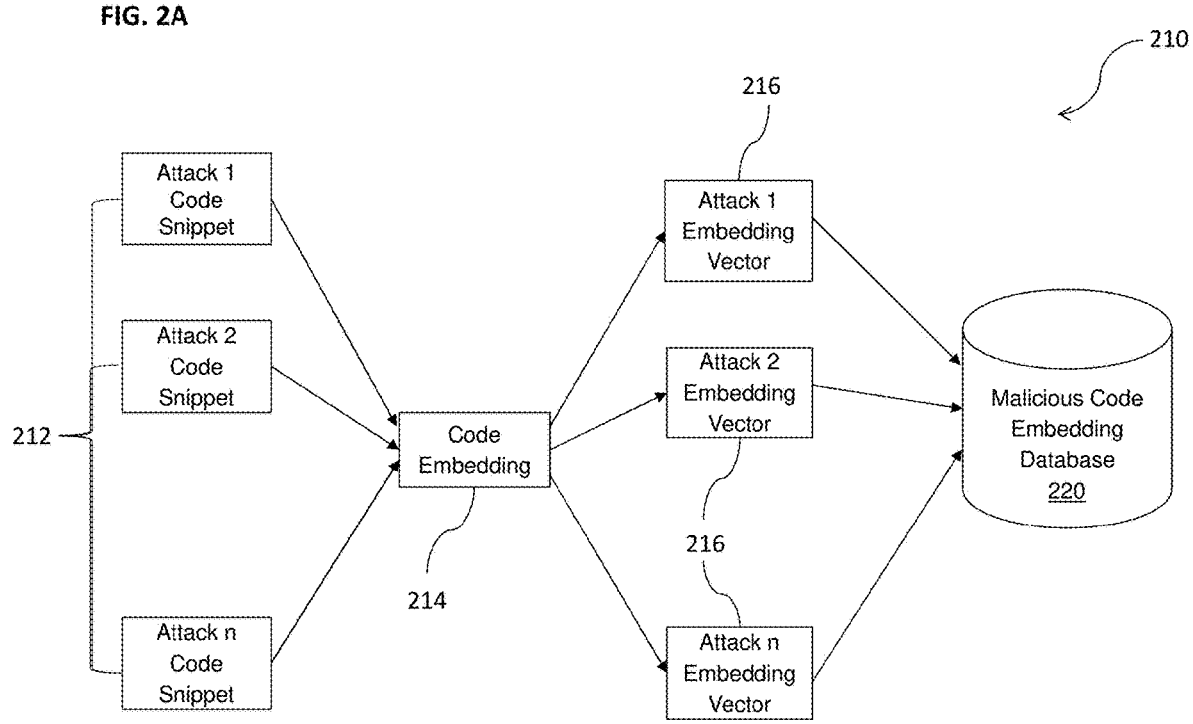
FIG. 2A is a diagrammatic representation 210 of a process for generating a malicious code embedding database.

FIG. 2A illustrates a diagrammatic representation 210 of a process for generating a malicious code embedding database. Attack code snippets 212 are subjected to a code embedding processes/mechanism 214 to produce a corresponding attack code embedding vector for each of the malicious attack code snippets 212. These malicious code vectors, or embeddings, are stored in a malicious code embedding database 220.

Figure 2B:
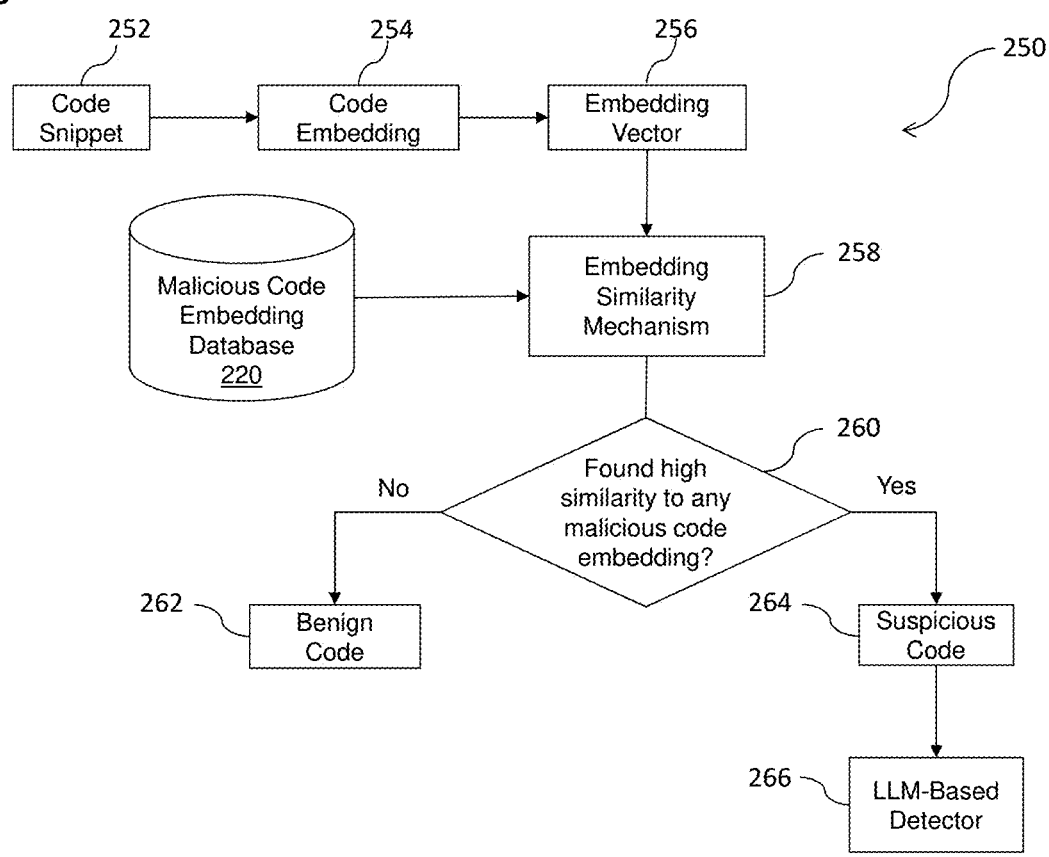
FIG. 2B is a flow diagram 250 of a process for the analysis of new code snippets using the code embedding mechanism

FIG. 2B illustrates a flow diagram 250 of a process for the analysis of new code snippets using the code embedding mechanism. A code snippet 252 (throughout the document, the terms 'code', 'code snippets', 'code fragment', 'code segments', 'code portions', 'files', and variations thereof are used interchangeably herein so indicate at least a portion of a software package) undergoes code embedding 254 to produce a representative vector or embedding vector 256. The embedding vector is then subjected to an Embedding Similarity Mechanism 258 which compares the embedding to malicious embeddings stored in the malicious code embedding database 220 (generated in the process detailed above with reference to FIG. 2A and constantly updated with new embeddings of malicious code). At decision step 260, the mechanism needs to decide if there is a high similarity to any malicious code embedding in the database. If it is determined that there is no or insufficient similarity to an existing malicious embedding, then code snippet is determined to be benign 262 (i.e., below a probability level/threshold of maliciousness). If the snippet is sufficiently similar to one or more existing embeddings from the database 220 then the snippet is labeled suspicious at 264 and forwarded to the LLM detector at 266.

In some cases, during the assessing step 104, the aforementioned code embedding mechanism 250 assigns a probability value that is used in combination with other probability values received from other assessment tools (that are run concurrently or sequentially with the present code embedding mechanism tool/process) to determine the probability level of the code snippet. If the code snippet probability level is above a predetermined probability level, then the code snippet is run through an LLM to determine if the code is malicious.

Prompt Embedding

The detection of malicious code using the code embedding mechanism relies on maintaining a code base of malicious code snippets. The Prompt embedding is a complementary mechanism that enables the detection of malicious code without using any database of malicious code snippets.

Figure 3A:
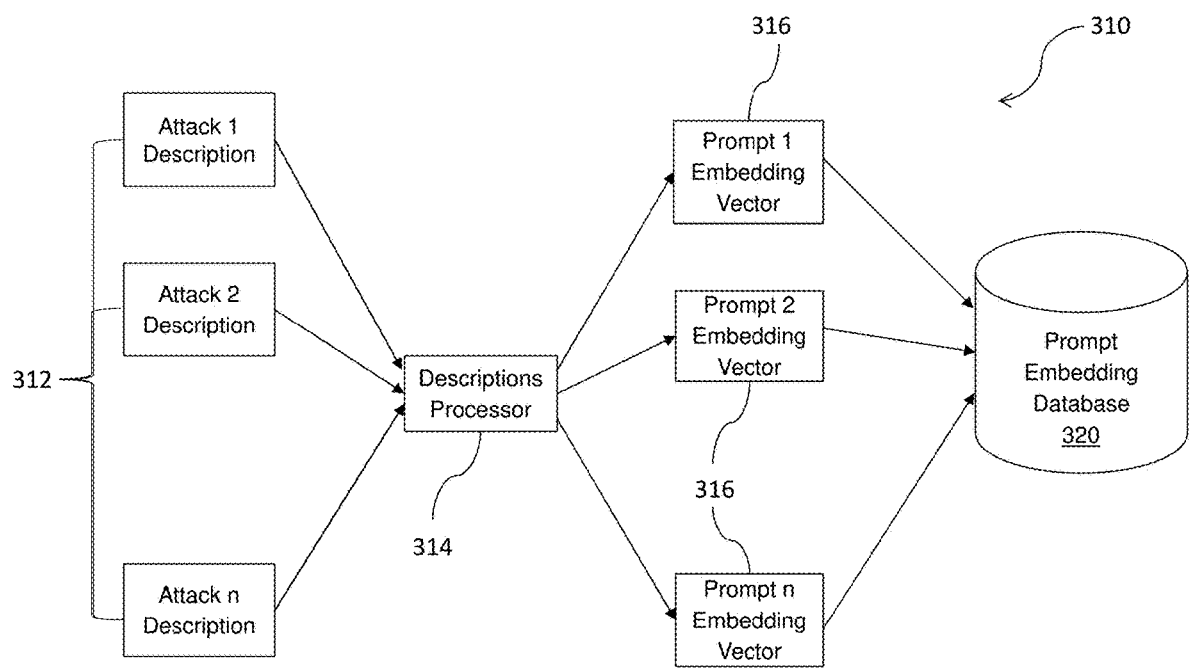
FIG. 3A is a diagrammatic representation 310 of a process for generating a prompt embedding database from malicious code.

FIG. 3A illustrates a diagrammatic representation 310 of a process for generating a prompt embedding database from malicious code. Instead of maintaining a code base of malicious snippets, the system maintains a database of free-text descriptions of cyber attacks. For example, "a malicious code that opens a reverse shell". Where the code base of the malicious code snippets contains examples of attacks in different programming languages (for example, various examples of reverse shell implementations in Python, J S, PHP, etc), the database of descriptions contains only a single free-text description of the attack.

This enables the system to not only identify whether a code snippet executes a specific attack, but also to sweep entire code repositories for potential threats described in natural language.

Like the Code embedding mechanism, the system utilizes smart embedding to represent cyberattacks' descriptions efficiently. Cyber-attack descriptions 312 are fed into a Descriptions processor 314 to generate corresponding prompt embedding vectors 316. The prompt embedding vectors 316 are stored in a prompt embedding database 320. The vector representation enables efficient similarity comparison between cyberattacks' descriptions and code fragments.

Figure 3B:
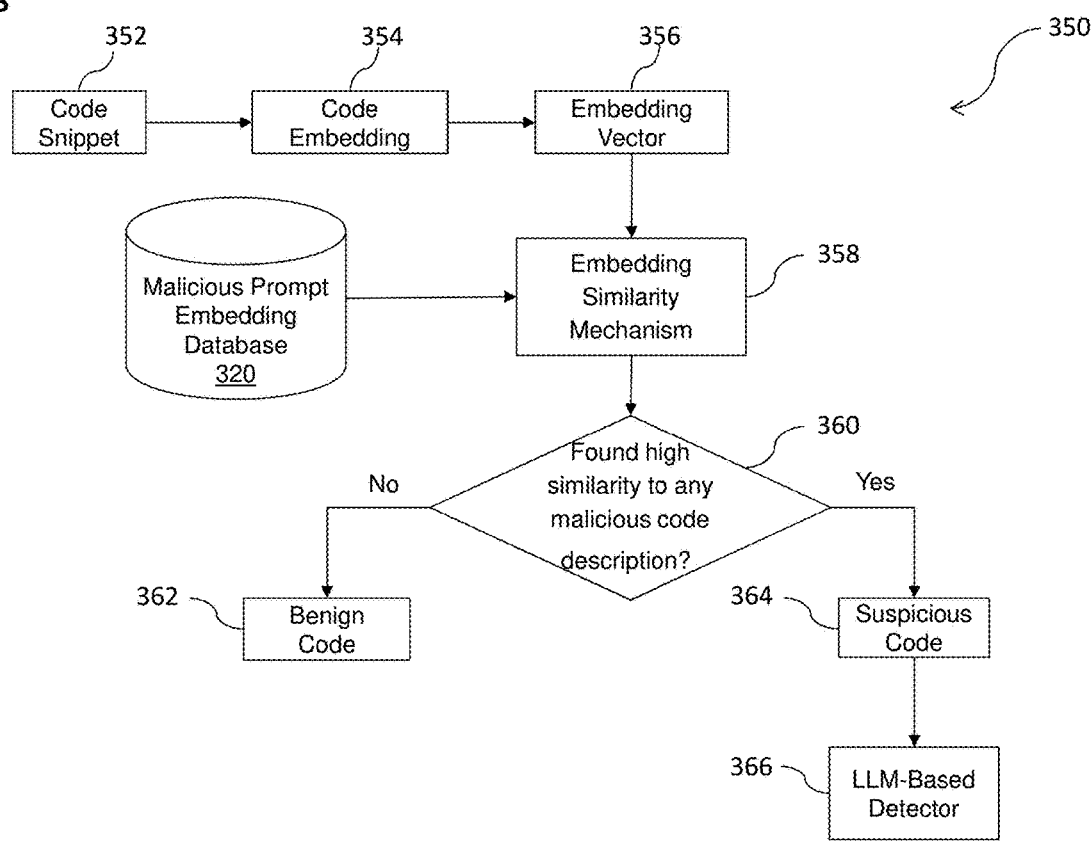
FIG. 3B is a flow diagram of a process 350 for the analysis of new code snippets using the Prompt embedding mechanism/process.

FIG. 3B illustrates a flow diagram of a process 350 for the analysis of new code snippets using the Prompt embedding mechanism/process.

Given a database 320 of free-text descriptions of cyber-attacks, the Prompt embedding mechanism is applied on each free-text description. Then, given new code snippets 352 for analysis, code embeddings 354 are generated. The embedding vectors 356 are compared, using an embedding similarity mechanism 358, to the embeddings of the cyber-attacks' descriptions in database 320. At decision step 360, the mechanism needs to decide if there is a high similarity to any malicious code description. If it is determined that there is no or insufficient similarity to an existing malicious embedding, then code snippet is determined to be benign 362. Code snippets with high similarity to malicious descriptions are flagged as suspicious/malicious at 364.

Similar to the Code embedding mechanism, the flagged code snippets are sent to the LLM-based detector 366, to provide a final decision regarding their maliciousness. In this manner, the system dramatically reduces the number of code snippets that are analyzed by the more expensive LLM-based detector.

In summary, the system employs a prompt embedding mechanism to assess whether a new code snippet is similar to malicious code by converting the code snippet into embedding and comparing the embedding to embeddings of [free text] descriptions of cyber-attacks/cyber-attack techniques.

In some cases, during the assessing step 104, the aforementioned prompt embedding mechanism 350 assigns a probability value that is used in combination with other probability values received from other assessment tools (that are run concurrently or sequentially with the present code embedding mechanism tool/process) to determine the probability level of the code snippet. If the code snippet probability level is above a predetermined probability level, then the code snippet is run through an LLM to determine if the code is malicious. Other tools/processes/mechanisms discussed herein can be used alone or in combination to determine the probability level of the code.

Example Test Case

To demonstrate the power of a search engine according to the present system and process, the system analyzed thousands of PyPi packages, using the aforementioned Prompt Embedding mechanism, and was able to pinpoint packages that contained fragments indicative of a reverse shell attack. Several packages, including proclean and sysversion, bore striking similarities to reverse shell implementations. The ability to detect those similarities without a reference database affirms the practical value of the present method in detecting and mitigating such threats effectively.

Instead of searching for exact code matches, the Prompt Embedding process interprets the intent and structure behind the natural language description to find code that behaves in the same way as known malicious code.

Malicious Pattern Recognizer

It has been mentioned previously that malicious code can be transformed into code embeddings. This process can be done, and is done, by LLMs such as ChatGPT™. Using an LLM to generate a code embedding is not as resource heavy as using the LLM to check if the code is malicious. Therefore, code embeddings (discussed heretofore and hereafter) may be generated by LLMs.

The Malicious Pattern Recognizer mechanism and process learns malicious code patterns using LLM embeddings (of malicious code), which, along with metadata, are used to form LLM code patterns (LCPs).

LCPs are simplified representations of code in vector format. The vector captures the essence of the code, allowing detectors to draw similarities between different pieces of code more efficiently. LCPs enable making malicious software detection more efficient and scalable.

To establish similarities and cluster code segments, the LCP detector incorporates the following:

LLMs: To construct an LCP, the system captures the essence of the code's logic using an LLM, allowing the system to express the code's essence in a compact and precise way.

Code analysis: To enrich the LCP, the system performs a preliminary analysis of the package code to extract the code's capabilities (e.g., "can it write files?", "can it perform HTTP requests?").

Probabilistic sampling: To support deep analysis at scale, the system takes a granular sampling using segmented pieces of code that have been determined to have a high probability of containing malicious code.

LCP indexing: Comparing suspicious code snippets to known malicious snippets at scale is done by indexing all LCPs in a vector database in a manner that allows fast comparison by similarity.

Dimensionality reduction: To further improve confidence, LCPs are employed to draw similarities with previous code snippets and cluster them together. The clustering process also serves as an independent signal, when multiple recently published code snippets exhibit high similarity, flagging abnormal patterns that are typically associated with malicious campaigns.

New code can be embedded and compared to malicious LCPs, allowing for the identification and classification of the attack pattern. So, the system does not need to run every piece of code through an LLM but rather use pattern recognition to see if this code is similar to other known code in the repository. If the other known code is malicious code, then this similar code needs to be looked at more closely (i.e., run through an LLM) to determine whether it too is malicious.

Figure 4:
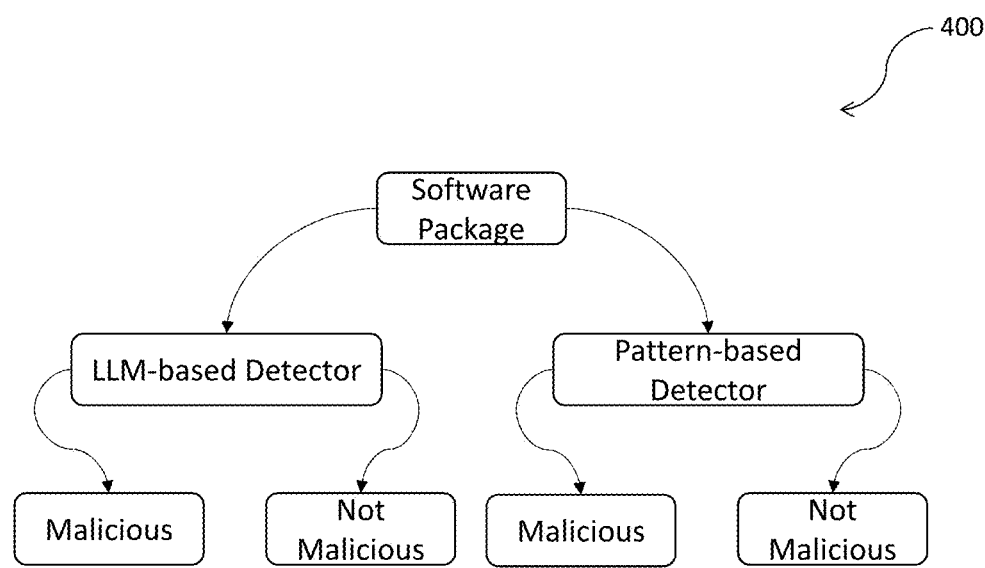
FIG. 4 is a representation of two approaches to detecting malicious packages and code snippets.

FIG. 4 depicts two approaches to detecting malicious packages and code snippets. One approach is based on the Malicious Pattern Recognizer process, and the other approach is based on the LLM-based detection. The two approaches complement each other.

Malicious Pattern Recognition Enhancer

The Malicious Pattern Recognition Enhancer generalizes past detections using LLMs to expand detection coverage. Detected [malicious] code vectors express variants of existing attack patterns, contributing to a unified and robust LCP while enabling the mechanism to learn nuances of attacks.

Figure 5:
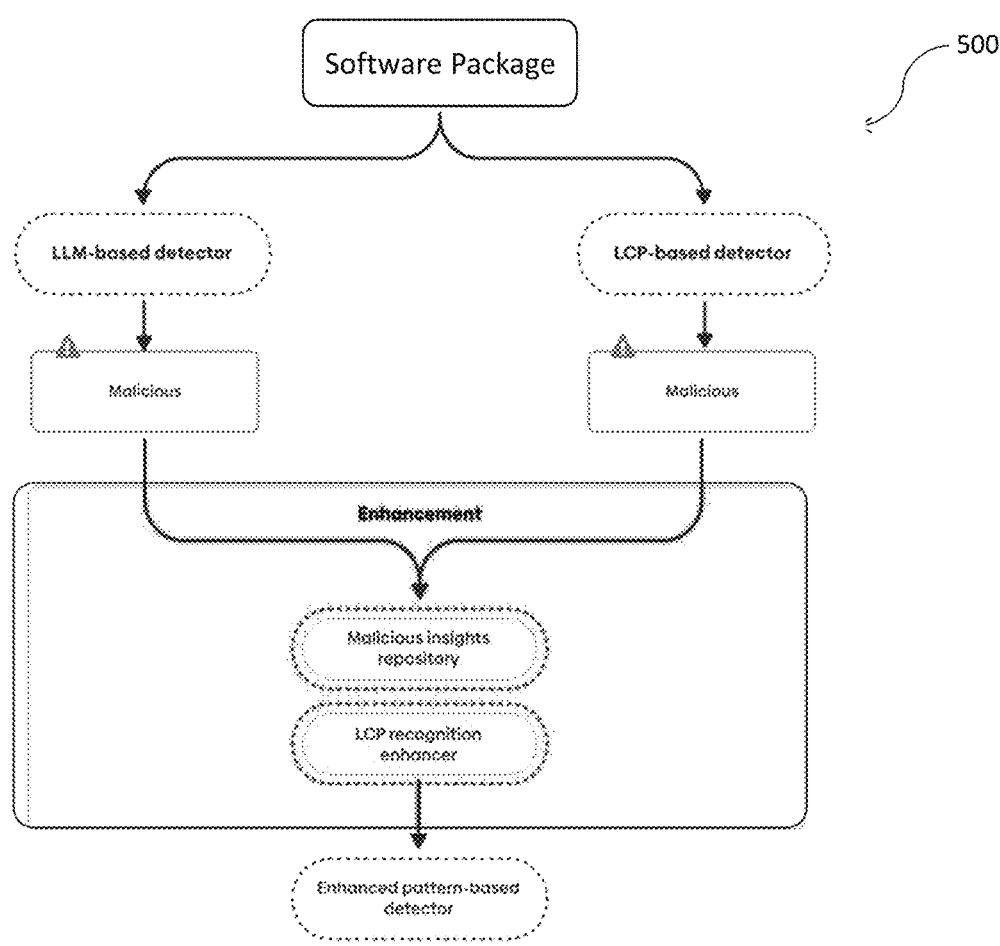
FIG. 5 is a diagrammatic representation of a Malicious Pattern Recognition Enhancer process.

Since the LCP-based detector improves as it is introduced to new LCPs, there is incorporated within the system an enhancer that uses an LLM that analyzes and understands malicious packages and code snippets, extracts LCPs, and feeds them to a pattern enhancer to create an improved detector. FIG. 5 depicts a diagrammatic representation of a Malicious Pattern Recognition Enhancer process 500.

An enhancer can contribute directly to the detection of malicious code, while also being able to learn the evolution of attacks, by having each generation of the pattern recognizer adapt to previous versions of the attack.

Scalable Detection Mechanism

Combining LLMs, proprietary code feature extraction, dimensionality reduction, and probabilistic sampling, the scalable detection mechanism identifies similarities and clusters packages. The analysis of code undergoes scanning and preliminary automatic analysis to determine the likelihood of malicious content.

If the code is capable of malicious activity—this is determined by a less-strong LM—then it may be passed to an LLM for a more labor intensive (i.e., resource intensive)/ expensive scan. Monitoring vast amounts of code and packages is enabled by combining these elements, providing scalability for modern codebases or package manager repositories.

Self-Improving Mechanism

Figure 6:
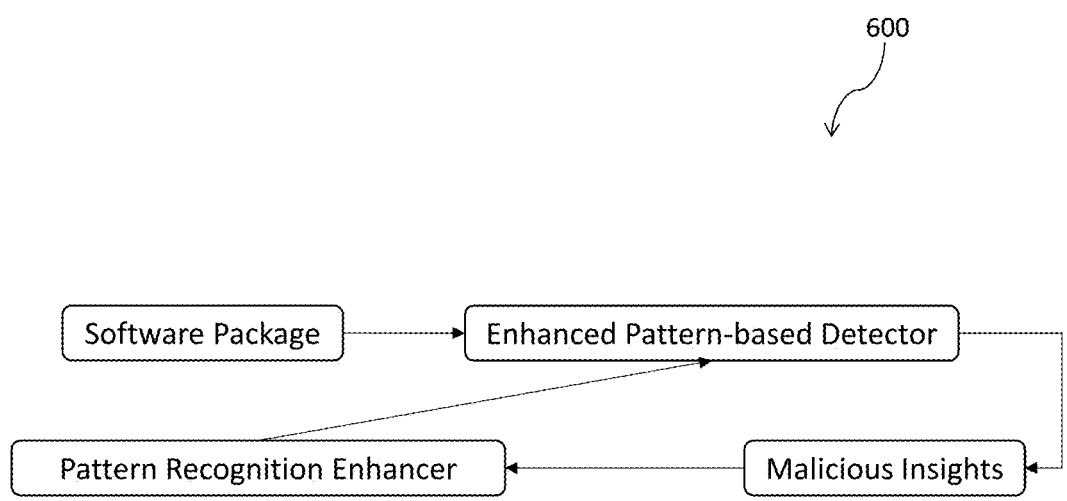
FIG. 6 is a diagrammatic representation of an example embodiment of a self-improving mechanism.

FIG. 6 is a diagrammatic representation of an example embodiment of a self-improving mechanism. The self-improving process or mechanism includes a Pattern Recognition Enhancer which analyzes malicious packages with LLMs and extracts descriptive patterns of these malicious packages. These patterns are incorporated into the Enhanced Pattern-based Detector. The system iterates over published packages to improve detection capabilities and discover more undiscovered variants. This mechanism effectively learns from various detectors' input, enhancing overall detection.

By keeping an index of package embeddings, including LCPs, any new detection can be compared against the index, leading to the discovery of malicious code in already published packages.

In this case the system also detects packages that were previously considered as benign. The diagram of FIG. 6 depicts a detection cycle mechanism. The whole process is an ongoing cycle which starts with malicious packages, goes on to extract LCPs, analyzes new packages and compares them to existing LCPs to detect new malicious packages, identify new LCPs from the new malicious packages, and then go back to find malicious packages among the already published packages that were considered as benign packages. The diagram shows that this is an iterative process that keeps detecting more and more malicious packages.

Low-Latency Alerts

As the mechanism is autonomous and does not require human intervention in most cases, immediate responses can be generated when a malicious package or committed code is published. This low-latency alert system reduces the time malicious code can operate, thus minimizing developers' exposure to such code.

The invention also allows for fine-tuning the patterns detector to declare code as suspicious when it closely matches an LCP without an exact match, providing a safety spectrum for published packages and facilitating customizable alerts based on security requirements.

Malicious Pattern Recognizer & Enhancer

The pattern recognition enhancer builds a detector that flags malicious packages. For example, the following packages were known to be malicious:

eth-libs
web3_checksums
web-const
eth_lib
eth-decoder
eth_py

Yet, a package named, web3_checksum, with a similar attack method, existed for a long time in the repository, and was discovered by the pattern-based detector, following an enhanced version/update derived from the packages above.

Figure 7:
FIG. 7 is a visualization of the similarity between representations of packages in low dimensional space.

FIG. 7 depicts a visualization of the similarity between representations of packages in low dimensional space. This visualization conveys some of the similarities.

Efficient LLM-Based Detection Mechanism

The direct and efficient LLM-based detector found previously unknown malicious packages using smart sampling and cascading filters. Smart sampling is asking a less-powerful LM what the likelihood a given code package is malicious. If the likelihood is high, then the code is passed on for scanning by a more powerful LLM. Another example of smart sampling is giving the list of names of files and asking which are the most likely to be malicious (see the visualization depicted in FIG. 7).

Cascading filters may be the binary question asked to the LM: is this file capable of being malicious? The answers are yes or no, without additional information. On top of that, LMs and similar machine-learning models can also predict the probability of maliciousness, and thereby derive better control of the files passed to the LLM. Alternatively, the LM can be asked whether the code is capable of doing malicious tasks, e.g., can it read other files, can it publish to the internet etc. If the answer is no, then we know that this code could not be part of an attack which stole passwords, for example.

The smart sampling and cascading filters are used to reduce the number of files that are eventually run through the LLM. If the filters work correctly, then the LLM is used most efficiently. For example, the following malicious package, menuloading-pygame, was detected as soon as it was published. The algorithm required scanning only 2 files to detect the malicious code. This approach drastically reduced the number of files required for the analysis.

Machine Learning and Artificial Intelligence cover a vast range of mechanisms, methods, and techniques. It is made clear that any type of machine learning model may be used. The term "machine learning (ML)" and grammatical variations thereof is intended to convey method of machine learning known in the art (e.g., artificial intelligence (AI), deep learning, neural networks, etc.) and/or combinations thereof. One example of a machine learning model is a neural network. The linkages in a neural network are generally pre-defined. Over some number of training examples, the strength of different relationships emerges by being reflected in the weights of each edge of the neural network as the weights of the edges are adjusted with each training example. In a neural network, an edge exists between two nodes and then over time it will develop a large or small weight reflecting a strong or weak relationship between the variables represented by the two nodes that the edge connects.

Another example embodiment of the machine learning model is a Convolution Neural Networks (CNN). The instant example is not intended to limit the method or system in any way, rather it is merely intended to portray one way of implementing the method and/or system.

Depending on what the ML model is trained for, the dataset is used to refine the model's ability to make the best decisions. It is true that market valuation and financial investment is a complex science-slash-art. However, training a model on certain aspects of the market can prove to be very successful. Also, following successful investors and investments, investment strategies that have proven themselves over time, and other proven wisdom can arm the model with many reliable tools for creating/successfully running a multi-generational savings fund.

For example, US20190378050A1 to Edkin et al. discloses a non-transitory computer readable medium storing computer-executable instructions that, when executed by a graphics processing unit, cause an ensemble of machine learning sub-engines to: train a machine learning model of the ensemble of machine learning sub-engines using a corpus, where the corpus includes a training data and a test data; classify a plurality of nodes in a graph, which includes nodes and edges and is stored in computer memory, based on the machine learning model, by setting a classification attribute of a first node and a second node of the plurality of nodes to one of a plurality of classifications; and insert an edge in the graph between the first node and the second node in response to the machine learning model detecting a pattern, where the first node corresponds to a first entity type and the second node does not correspond to a second entity type. Other embodiments of this aspect include corresponding computer systems, apparatus, and computer programs recorded on one or more computer storage devices, each configured to perform the actions of the methods. US20190378050A1 is incorporated by reference as if fully set forth herein.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Machine learning (ML) is a branch of artificial intelligence (AI) that leverages data to improve computer performance by giving machines the ability to "learn".

Machine learning algorithms build a model based on sample data, known as training data, in order to make predictions or decisions without being explicitly programmed to do so. Machine learning algorithms are used in a wide variety of applications, such as in medicine, email filtering, speech recognition, agriculture, and computer vision, where it is difficult or unfeasible to develop conventional algorithms to perform the needed tasks. As used herein, the ML algorithms are employed, for example, for creating or assisting in the creation of contracts. ML algorithms are also employed, for example, as part of the Evidence Analysis Module or subsystem that analyzes the evidence that is provided as proof that a milestone has been met or a proof that a milestone has not been met, or not been met to a satisfactory degree. For example, ML algorithms for computer vision can be employed to analyze uploaded images that are intended to show before and after images of a task. The models may be trained on images of products so as to be able to recognize given features in an image.

A subset of machine learning is closely related to computational statistics, which focuses on making predictions using computers, but not all machine learning is statistical learning. The study of mathematical optimization delivers methods, theory and application domains to the field of machine learning. Data mining is a related field of study, focusing on exploratory data analysis through unsupervised learning.

Some implementations of machine learning use data and artificial neural networks in a way that mimics the working of a biological brain.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for the efficient use of Large Language Models (LLMs) in malicious code detection, the method comprising:
   assessing code and assigning a probability level of being malicious; and
   running code assessed to be above a predetermined probability level through an LLM to determine if the code is malicious
   wherein the assessing step employs a prompt Embedding mechanism to determine the probability level of maliciousness, the prompt embedding mechanism including:
      generating a vector representation of the code being assessed,
      comparing and clustering of the vector representation with a database of malicious prompt embeddings, and
      assigning a probability value based on similarity to one or more of the malicious code embeddings;
   wherein the probability value is used in calculating the probability level during the assessing step.

2. The method of claim 1, further comprising:
   filtering the code, prior to the assessing step, to determine whether the code is capable of performing one or more activities of a predetermined set of activities necessary for malicious activity.

3. The method of claim 2, wherein the filtering step employs a binary filter.

4. The method of claim 1, wherein the assessing step uses at least heuristics to determine the probability level of maliciousness.

5. The method of claim 1, wherein the assessing step employs a Code Embedding mechanism to determine the probability level of maliciousness, the code embedding mechanism including:
   generating a vector representation of the code being assessed,
   comparing and clustering of the vector representation with a database of malicious code embeddings, and
   assigning a probability value based on similarity to one or more of the malicious code embeddings;
   wherein the probability value is used in calculating the probability level during the assessing step.

6. The method of claim 5, wherein the database of malicious code embeddings includes a plurality attack embedding vectors each generated by a code embedding mechanism from a corresponding malicious code.

7. The method of claim 1, wherein the database of malicious prompt embeddings includes a plurality prompt embedding vectors each generated by a descriptions processor from a corresponding free-text description of a malicious cyber-attack technique.

* * * * *